(12) United States Patent
Banting et al.

(10) Patent No.: US 7,609,158 B2
(45) Date of Patent: Oct. 27, 2009

(54) ELECTRICAL POWER SYSTEM CONTROL COMMUNICATIONS NETWORK

(75) Inventors: John Fredrick Banting, Waukesha, WI (US); Frank John Muench, Waukesha, WI (US)

(73) Assignee: Cooper Technologies Company, Houston, TX (US)

( * ) Notice: Subject to any disclaimer, the term of this patent is extended or adjusted under 35 U.S.C. 154(b) by 416 days.

(21) Appl. No.: 11/586,962

(22) Filed: Oct. 26, 2006

(65) Prior Publication Data

US 2008/0100436 A1    May 1, 2008

(51) Int. Cl.
G08B 1/08    (2006.01)
(52) U.S. Cl. .................................. 340/539.22
(58) Field of Classification Search ............ 340/539.22, 340/825.69, 286.02, 310.11, 657, 3.43; 455/73; 324/500
See application file for complete search history.

(56) References Cited

U.S. PATENT DOCUMENTS

| | | | |
|---|---|---|---|
| 3,025,512 A | 3/1962 | Bloechl |
| 3,364,481 A | 1/1968 | Fuzzell |
| 3,460,038 A | 8/1969 | Ziegler |
| 3,700,967 A | 10/1972 | Ross |
| 3,720,872 A | 3/1973 | Russell et al. |
| 3,735,248 A | 5/1973 | Reese |
| 3,816,816 A | 6/1974 | Schweitzer, Jr. |
| 3,995,243 A | 11/1976 | Malmborg |
| 4,000,462 A | 12/1976 | Boyd et al. |
| 4,037,155 A | 7/1977 | Ahmed |
| 4,045,726 A | 8/1977 | Schweitzer, Jr. |
| 4,157,520 A | 6/1979 | Moates et al. |
| 4,165,528 A | 8/1979 | Schweitzer, Jr. |
| 4,288,743 A | 9/1981 | Schweitzer |
| 4,335,437 A | 6/1982 | Wilson et al. |
| 4,456,873 A | 6/1984 | Schweitzer, Jr. |
| 4,466,042 A | 8/1984 | Zylstra et al. |
| 4,495,489 A | 1/1985 | Schweitzer, Jr. |
| 4,558,310 A | 12/1985 | McAllise |
| 4,593,276 A | 6/1986 | Aida et al. |
| 4,630,218 A | 12/1986 | Hurley |
| 4,661,813 A | 4/1987 | Mazzamauro et al. |
| 4,686,518 A | 8/1987 | Schweitzer, Jr. |
| 4,694,599 A | 9/1987 | Hart et al. |
| 4,739,149 A | 4/1988 | Nishiwaki et al. |
| 4,794,332 A | 12/1988 | Schweitzer, Jr. |
| 4,795,982 A | 1/1989 | Schweitzer, Jr. |
| 4,801,937 A | 1/1989 | Fernandes |
| 4,847,780 A | 7/1989 | Gilker et al. |
| 4,881,028 A | 11/1989 | Bright |
| 4,984,124 A | 1/1991 | Yeh |

(Continued)

FOREIGN PATENT DOCUMENTS

WO    WO 2007/143378    12/2007

(Continued)

OTHER PUBLICATIONS

U.S. Appl. No. 11/982,588, Banting et al.

(Continued)

*Primary Examiner*—Phung Nguyen
(74) *Attorney, Agent, or Firm*—King & Spalding LLP

(57) ABSTRACT

Communication networks having redundant signal paths for sensed operating conditions and control parameters for electrical power transmission and distribution systems.

27 Claims, 3 Drawing Sheets

U.S. PATENT DOCUMENTS

| | | | |
|---|---|---|---|
| 5,029,039 A | 7/1991 | Yeh | |
| 5,095,274 A | 3/1992 | Brokaw | |
| 5,159,319 A | 10/1992 | Dunk et al. | |
| 5,220,311 A | 6/1993 | Schweitzer, Jr. | |
| 5,241,444 A | 8/1993 | Yeh | |
| 5,258,903 A | 11/1993 | Rodriguez-Cavazos | |
| 5,440,234 A | 8/1995 | Kondo | |
| 5,475,371 A | 12/1995 | Dunk et al. | |
| 5,485,545 A | 1/1996 | Kojima et al. | |
| 5,497,096 A | 3/1996 | Banting | |
| 5,537,327 A | 7/1996 | Snow et al. | |
| 5,548,279 A | 8/1996 | Gaines | |
| 5,559,500 A | 9/1996 | Kase | |
| 5,574,387 A | 11/1996 | Petsche et al. | |
| 5,576,632 A | 11/1996 | Petsche et al. | |
| 5,629,870 A | 5/1997 | Farag et al. | |
| 5,661,626 A | 8/1997 | Takeuchi | |
| 5,675,497 A | 10/1997 | Petsche et al. | |
| 5,714,886 A | 2/1998 | Harris | |
| 5,726,847 A | 3/1998 | Dalstein | |
| 5,734,575 A | 3/1998 | Snow et al. | |
| 5,754,383 A | 5/1998 | Huppertz et al. | |
| 5,784,233 A | 7/1998 | Bastard et al. | |
| 5,796,631 A | 8/1998 | Iancu et al. | |
| 5,805,400 A | 9/1998 | Kim | |
| 5,959,537 A | 9/1999 | Banting et al. | |
| 6,538,797 B1 | 3/2003 | Bowles et al. | |
| 7,398,097 B2 * | 7/2008 | Parkulo | 455/521 |
| 7,453,267 B2 * | 11/2008 | Westbrock et al. | 324/522 |
| 2005/0017755 A1 | 1/2005 | Gunn et al. | |
| 2006/0063522 A1 | 3/2006 | McFarland | |
| 2007/0059986 A1 * | 3/2007 | Rockwell | 439/638 |
| 2008/0001735 A1 * | 1/2008 | Tran | 340/539.22 |

OTHER PUBLICATIONS

U.S. Appl. No. 11/982,587, Banting et al.
U.S. Appl. No. 12/048,963, Banting et al.
"EE's tools & toys", IEEE Spectrum, Dec. 1997, pp. 62-63.
"Fault Indicators, S.T.A.R.TM. Type ER Faulted Circuit Indicator Installation Instructions s320-60-1", Dec. 1997, Cooper Power Systems, pp. 1.-2.
"Fault Indicators, S.T.A.R..TM. Faulted Circuit Indictors Electrostatic Reset Type 320-60" May 1997, Cooper Power Systems, pp. 1-4.
"Fault Indicators, S.T.A.R.,TM. Type TPR Faulted Circuit Indicator Installation Instructions s320-40-1", Dec. 1997, Cooper Power Systems, pp. 1-3.
"Fault Indicators, S.T.A.R..TM. Faulted Circuit Indicators Test Point Reset Type 320-40", May 1997. Cooper Power Systems, pp. 1-4.
"S.T.A.R..TM. Faulted Circuit Indicators, Test Point Reset Type", Cooper Power Systems, Jan. 1998, Bulletin No. 97034.
"Fault Indicators, S.T.A.R..TM. Faulted Circuit Indicators Low Voltage Reset Type 320-50", May 1997, Cooper Power Systems, pp. 1-4.
"Fault Indicators, S.T.A.R..TM. Type LV Faulted Circuit Indicator Installation Instructions s320-50-1", Cooper Power Systems, pp. 1-4, May 1997.
"S.T.A.R..TM. Faulted Circuit Indicators, Low Voltage Reset Type", Cooper Power Systems, Jan. 1998, Bulletin No. 97035.

* cited by examiner

ELECTRICAL POWER SYSTEM CONTROL COMMUNICATIONS NETWORK

BACKGROUND OF THE INVENTION

This invention relates generally to electrical power systems, and more specifically to systems and methods for monitoring, managing and controlling power transmission and distribution systems.

Medium and high voltage electrical generation and transmission systems present complex issues from an oversight, maintenance and control perspective. The scope of such electrical networks and systems, both in terms of the number of interconnected equipment and devices and the geographic areas covered by the transmission and distribution systems, can be enormous. Efficient operation and control of such electrical networks is key to minimizing power interruptions and outages to scores of residential and commercial customers, and/or containing avoiding fault conditions and associated damage to the power system and/or residential and commercial equipment and devices connected to the power system.

Thus far, the capability of power utility firms to reduce power outages and interruptions and to prevent damage associated with electrical faults has been limited by difficulties in collecting sufficient data needed to assess, in a centralized location, operating conditions of the power system at points of interest. Prudent control decisions, identification of problems areas and concerns, and effective troubleshooting of the power system is difficult without adequate data collection and communication to control centers. More effective control schemes for electrical power systems are desired.

DETAILED DESCRIPTION OF THE INVENTION

Figure 1:
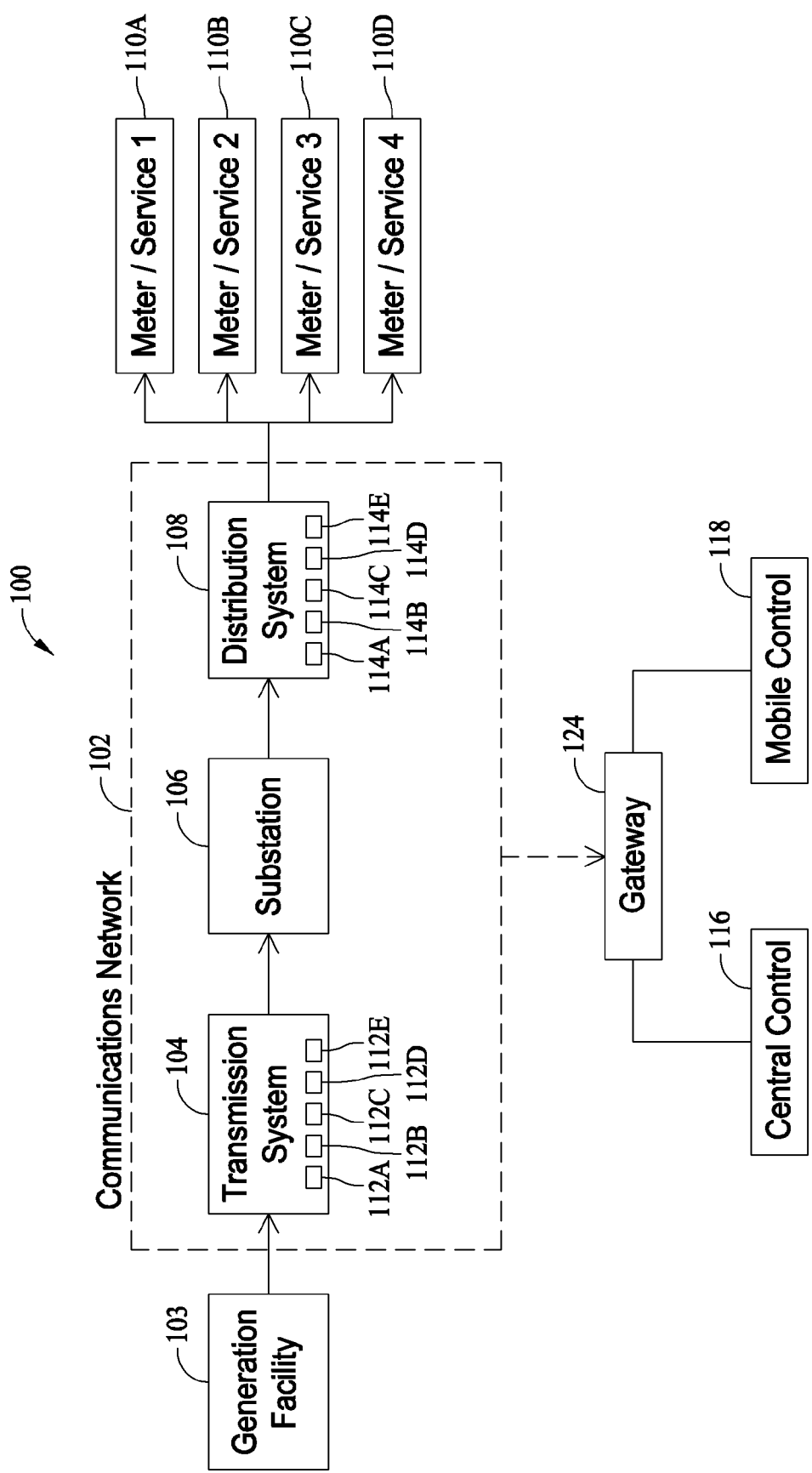
FIG. 1 schematically illustrates an electrical power system provided with a control communications network according to the invention.

For a full appreciation of the inventive aspects of exemplary embodiments of the invention described below, the disclosure herein will be segmented into different parts. Electrical power systems and associated problems in the art are first discussed in Part I. Conventional data communication methods used for controlling power systems are disclosed in Part II. Exemplary embodiments of the invention are disclosed in Part III.

I. Introduction to Electrical Power Systems

Electrical power systems operated by electrical utility firms and the like typically include a large number of transformers, capacitor banks, reactors, motors, generators and other major pieces of electrical equipment often interconnected with heavy duty cabling and switching devices for connecting and disconnecting the equipment to the network. The switching devices may be operated manually at the location of the switching devices, automatically in response to command instructions, or remotely from a control center or operator station. A variety of sensors are typically utilized to monitor operating conditions of the equipment and connected power lines and components. A number of controllers, internal to or external to the active switching components, are responsive to sensed electrical parameters to control the system, by connecting, disconnecting and isolating portions of the circuitry and connected devices and equipment from other portions of the circuitry.

In addition, the electrical equipment in the power system is typically protected from potentially damaging electrical conditions on the network. Such conditions are sometimes referred to as electrical fault conditions, and may include events such as open circuit conditions, short circuit conditions, overvoltage conditions, and overcurrent conditions. Protective components connected to the circuit, including but not limited to fuses, breakers, limiters, arrestors, and protective relay devices are designed to open and close circuit paths in the system in response to actual operating conditions. Such protective devices may be integral to switching devices or other components or separately provided from the switching devices.

Maintenance and oversight of electrical power generation and transmission networks is challenging in a number of aspects. For example, the number of equipment and devices connected to the network can easily number in the hundreds, and the number of different types of equipment and devices in the power system can also be significant. Successful operation of electrical power systems are of course dependent upon accurate sensing and measurement of operating conditions, and reliable transmission of control commands and instructions throughout the system.

Aside from the sheer number of devices in the network, and considerable differences in purpose, function and structure between the devices, the power system may be spread over a wide geographic area. Further, the power system may in part be located in indoor and outdoor locations, and may in part be located above ground or underground. Additionally, various types of insulation may be utilized, for example, in the switching devices to address electrical arcing issues as electrical connections are made and broken, including but not limited to air insulation, dielectric gas insulation, and other liquids or fluids. Some equipment and devices are housed in protective enclosures while others are exposed. Establishing effective monitoring and control systems to overcome such diversity in geographic location, site conditions for equipment and devices to be monitored, and varying operating conditions among monitored equipment and devices in the power system is difficult.

Finally, the electrical power systems operated by utility firms are often a patchwork of relatively new and relatively old equipment and switching devices. The electrical power systems are prone to significant modification and expansion as demand for electrical power increases, as well as during repair and maintenance of existing infrastructure, resulting in newer equipment being connected to existing power systems having much older equipment and devices. Coordinating the control needs of older devices and newer devices in an effective way presents still further challenges.

A primary difficulty to date has been how to efficiently provide sensed data and information to a central location for use by an electrical utility firm to manage the power system, and also how to provide the ability to remotely control devices in the network in a cost-effective manner.

II. Conventional Control Communication Schemes

Communication of data, whether sensed data relating to operating conditions of the power system or control data including commands and instructions executable in the power system, has conventionally been addressed in a variety of ways.

One conventional communication scheme involves devices communicating on a peer-to-peer basis. That is, each device in the communication scheme communicates with a compatible peer device somewhere else in the power system, and data messages are transmitted through a chain of compatible peer devices to a controller or operator or a centralized utility control center. Satisfactory operation of such systems, however, is dependent on an adequate number of peer devices and strategic positioning of the same in the system. Introducing an appropriate number of such peer devices in a large electrical system, and optimizing their location in the system, can be undesirably expensive. Such systems may also be adversely impacted by the failure of a single device that interrupts the communication chain. Also, compatibility issues may exist among different types of devices or among older and newer devices, such that establishing a consistent and reliable communications protocol using peer devices is difficult. At least for these reasons, peer-to-peer communication systems are difficult to implement and have not adequately solved difficult communication problems in the art.

Cellemetry techniques using telemetrics, long-range radio communications, and mobile drive by communication using standard radio communication methods have also been conventionally utilized for data collection and storage purposes in electrical power systems. While such techniques may be highly reliable for some portions of power systems and for selected devices, implementing them on a broader scale is problematic. Equipment, labor, and infrastructure costs associated with such schemes can be significant. Also, the data collected must still be processed and coordinated with other data at a control center or other location to be of any real use to operators of the power system. Transmitting, downloading, or otherwise communicating data from different sources to a central utility control center, and associated delays in receiving and processing the data at the control center may compromise the ability to proactively manage the power system. A more universally applicable and more timely solution is desired.

Sensed data and control communications have also been proposed for transmission of data via hard-wired connections, optical systems, telephony systems, Broadband over Power Line (BPL) system, and Power Line Carrier (PLC) systems. These techniques, however, require point-to-point wiring and are not cost effective to implement in a power system having a large number of sensors distributed over a wide area.

Wireless Fidelity ("WiFi") systems operable under IEEE standard 802.11, WiMAX wireless digital communication systems, radio transceiver systems, and various other communication methods are also known. One such system allows for a sensor to communicate wirelessly to a control, that in turn communicates the sensor information via a long range radio to a web service where the subscriber can log on to receive the sensor information. Yet another known system allows for up to twelve devices to be hard wired to a control box provided with a short-range radio so that a user can drive up to the control box and interrogate the sensor information. The cost of implementing such wireless communication schemes for all the sensors in a utility power system would be cost prohibitive in most cases with the technology currently employed.

III. Exemplary Embodiments of the Invention

Highly flexible and highly reliable control communication networks are disclosed herein that are readily adaptable to existing power system networks at reduced cost relative to existing communication methods. Communication networks of the invention are also universally applicable for different types of devices and equipment and in different and may be used in considerably varying locations, sites, and operating conditions in a power system. Communication networks of the invention are also accommodating of future expansion and modification of the power system. Data may be collected more or less in real time across an entire network at a reasonable cost.

FIG. 1 schematically illustrates an exemplary electrical power system 100 provided with an exemplary data communications network 102 according to the invention. The electrical power system 100 is of the type that is typically constructed, operated and maintained by an electrical power utility firm or electric company, for example, that supplies bulk electrical power to a broad customer base. It is appreciated, however, that the power system 100 may alternatively be constructed to meet the power needs of a particular manufacturing or industrial facility, for example, as is known in the art.

As shown in FIG. 1, the power system may include a generation facility 103, a transmission system 104, a substation 106, a distribution system 108, and a number of meter/service points 110A, 100B, 110C, 110D for supplying electrical power to residential or business customers. In the case of a standalone power system for a particular facility the meter/service points 110A-D may correspond to the electrical loads of the facility.

The generation facility 103 may include a number of stepup transformers supplying power to the transmission system 104 for bulk transmission of power with reduced losses. The transmission system 104 may therefore transport power from the generation facility 103 at high voltage, typically 110 kV or more, to the substation 106. The substation 106 typically includes step down transformers and the like interfacing the transmission system 104 with the distribution system 108. By virtue of the substation 106, the distribution system 108 typically distributes power at a lower voltage, typically 33 kV or less, from the substation 106 to meter/service access points 110 at the home or building service entrance of the utility customers, or at the site of the electrical loads connected to the power system 100. Additional step down transformers are typically utilized to provide power at an appropriate voltage at the meter/service points 110.

The generation facility 103 is sometimes referred to as a power plant or power station, although power may be generated in other non-power plant facilities if desired. It is also understood that in some embodiments a backup generator or backup power supply may correspond to the "generation facility" shown in FIG. 1. The electrical power may be generated in the generation facility 103 in a known manner, including but not limited to one or more power generation techniques utilizing petroleum, natural gas, and coal, as well as alternative techniques such as hydroelectric power generation, nuclear power generation, solar energy, tidal harnesses, wind generators, and geothermal methods. Other power generation techniques may likewise be utilized in further and/or alternative embodiments.

In an exemplary embodiment, the generation facility 103 provides three phase alternating current (AC) electrical power that may be transmitted across great distances at low cost via the transmission system 104. In another embodiment, single phase or polyphase AC power may be provided. Still further, direct current (DC) electrical power may be provided by the generation facility 103, although the transmission of DC power is known to be more expensive than for AC electrical power.

While represented in simplified form in FIG. 1, the power system 100 may include more than one generation facility 103 feeding the same or different transmission systems 104. Likewise, each transmission system 104 may feed multiple substations 106 that, in turn, feed power to the same or different distribution systems 108. Each distribution system 108 may feed hundreds or thousands of meter/service points 110. The scope of the power system 100 may therefore be extensive. The transmission system 104 and the distribution system 108 may span great distances in all directions to cover vast geographic areas, and may be located in part above ground via overhead power lines and in part below ground via buried cables, vaults, etc. The transmission system 104 and the distribution system 108 are sometimes referred to as a power grid.

Each of the transmission system 104 and distribution systems 108 may be a network of electrical circuits including cabling, equipment, switching devices, and protective devices, as well as sensing devices 112A-E and 114A-E to monitor or control the power flow in portions of the network. As used herein, "cabling" shall refer to non-insulated and insulated cables and conductor lines connecting one portion of the power system 100 to another. "Equipment" shall refer to transformers, capacitor banks, reactors, motors, generators and other major pieces of electrical equipment. "Switching devices" shall refer to disconnects, switching mechanisms, and switchgear, including but not limited to pad-mounted or underground switchgear having, for example, an enclosure or container that houses bushings, insulation, a bus bar system, one or more active switching elements, and bushings to supply line and load connections. The switchgear may be provided with solid dielectric insulation, gaseous dielectric insulation, or fluid dielectric insulation as is known in the art. "Protective devices" shall refer to active and passive components such as protective relays, fuses, breakers, limiters, interrupters, surge arresters and the like that provide one or more of overcurrent protection, overvoltage protection, short circuit protection, open circuit protection, and the like to electrical circuits. The protective devices may be integrated into the switching devices and/or may be separately provided. Some protective devices may likewise be used apart from any switching device.

The sensing devices 112 and 114 may be, for example, current sensors, voltage sensors, temperature sensors or other known sensors that may be used to sense an electrical parameter of the transmission system 104 and the distribution system 108 in operation. Based upon the conditions sensed by the sensing devices 112, and 114, control decisions may be made to open or close portions of the transmission or distribution system, optimize the transmission or distribution systems, and identify and diagnose problem portions of the transmission and distribution systems. One commonly used type of sensing or measurement device 112 or 114 in existing power systems is a current transformer. Another sensing or measurement device 112, 114 having much promise for electrical power systems is a Rogowski coil. Details regarding current transformer operation and Rogowski coil construction operation are disclosed in commonly owned U.S. pat. Ser. No. 11/400,087 filed Apr. 7, 2006 and entitled Protective Relay Device, System, and Methods for Rogowski Coil Sensors, the entire disclosure of which is hereby incorporated by reference in its entirety.

While current transformers and Rogowski coils are specifically noted for use as the sensing devices 112 or 114, it is appreciated that other types of sensors may be utilized in other embodiments. A variety of other equipment parameters may be sensed, examined, manipulated and reported via the sensing devices 112 or 114, including power factor values, wind speed values, liquid levels, dissolved gas content and pressure, and equipment position and location in the system. Of course, still other parameters may be sensed and detected, alone or in combination with the parameters listed above.

The sensing devices 112 and/or 114 may be provided at the location of the equipment, switching devices, and protective devices in the transmission and distribution systems 104 and 108, or alternatively may be provided at locations upstream or downstream of the equipment, switching devices, and protective devices as desired. The sensing devices 112 and 114 may directly monitor the equipment, switching devices and protective devices, or may alternatively monitor cabling associated with the switching equipment, switching devices, and protective devices.

The location of the sensing devices 112 and 114 in the power system 100 is sometimes referred to as a sensing node, and it is desirable to communicate sensed data and information provided by the sensing devices 112 and 114 to a central location or control center 116. The central control center 116 may be, for example, a main office of an electrical power utility firm where an operator can view information or remotely control the equipment, switching devices, and protective devices in the network of either the transmission system 104 or the distribution system 108. Alternatively, the central control center 116 may be physically present at or near one or more of the substations 106 in the power system 100, or even elsewhere if desired.

It may also be desirable in some instances to communicate data and information to and from the devices 112 and 114 to a mobile control center 118, in addition to or in lieu of the central control location 116. For example, it may be desirable to communicate status and event history information from the central control location 116 to the location of the sensing devices, and affected equipment, switching and protective devices for use by line technicians and maintenance personnel of the networks, and this may be accomplished via the mobile control center 118. The mobile control center 118, in an illustrative embodiment, may be a mobile computer system carried in a vehicle, for example, to the locations of interest in the system. Alternatively, the mobile control center 118 may be a portable device, including but not limited to a hand held-processor based device carried to the site by the user. The mobile control center 118 may also include wireless receiving and interrogation features, for example, to directly communicate with the sensing devices 112, and 114 of interest.

Many of the sensing devices 112 and 114 may be processor based, electronic devices fully capable of gathering and storing information and data for use by the utility. The challenge, of course, is to efficiently communicate data and information from the devices 112 and 114 to the central control location 116, and from the control location 116 to the devices 112 and 114 in a cost effective and reliable manner.

In an exemplary embodiment of the invention, communication between the sensing devices 112 and 114 and the control centers 116 and 118 is accommodated by a mesh communication network 102 that is interspersed in the transmission system 104 and the distribution system 108. The control communications network, as explained below, facilitates communication of monitoring signals corresponding to sensed or detected conditions of the transmission system 104 and the distribution system 108, as well as control signals corresponding to control inputs and instructions for the active devices and equipment in the transmission system 104 and the distribution system 108 to operate the network by opening, closing, and interrupting circuit paths to isolate portions of the circuitry and operate and control the transmission and distribution systems 104 and 108.

Figure 2:
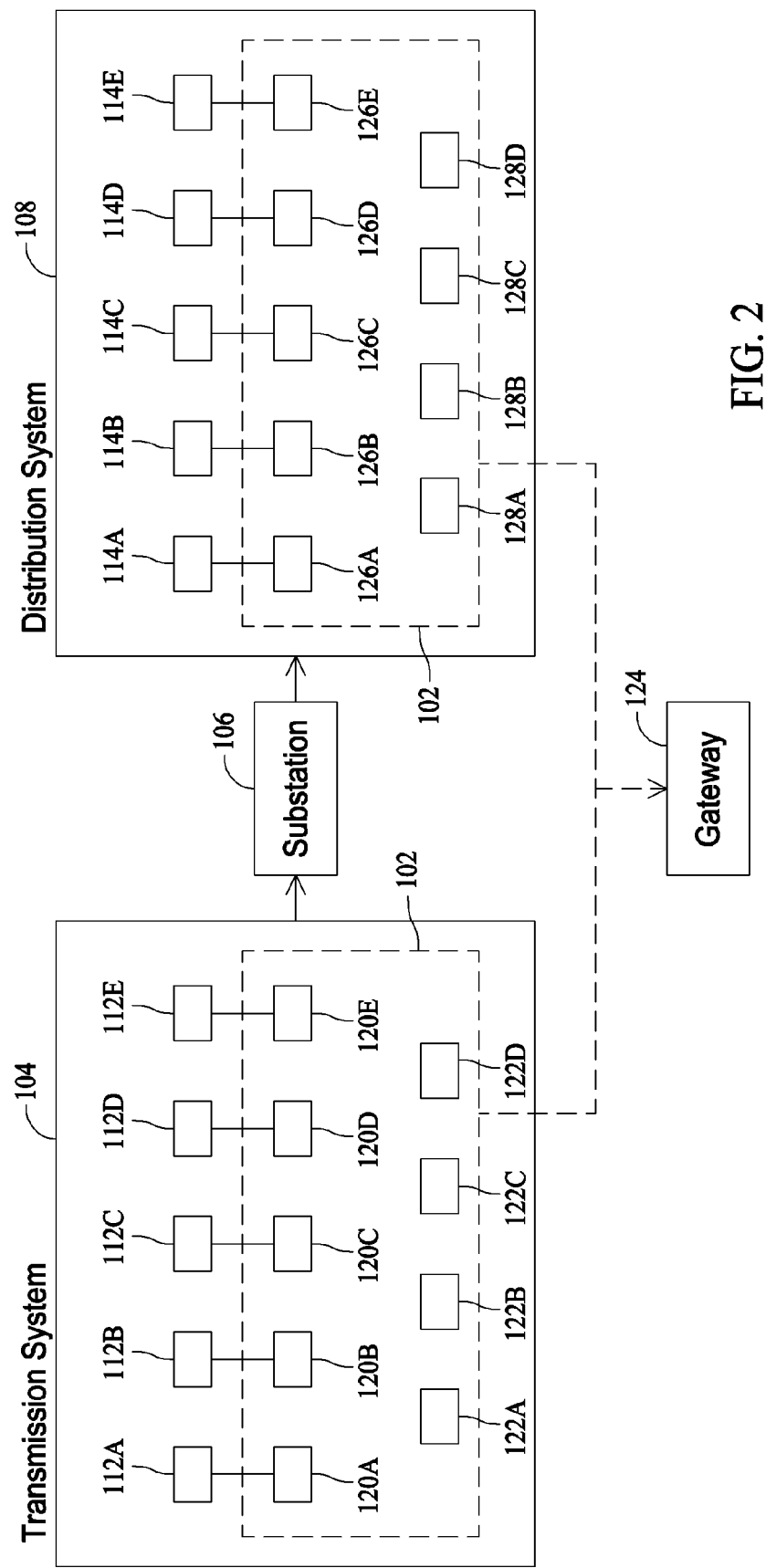
FIG. 2 schematically illustrates a portion of the power system and communications network shown in FIG. 1.

Referring now to FIG. 2, the transmission system 104 is schematically illustrated with a portion of the communication network 102. The communication network 102 includes a number of wireless sensor communication devices 120A, 120B, 120C, 120D, and 120E respectively associated with the sensing devices 112A, 112 B, 112C, 112D, and 112E. A number of wireless control communication devices 122A, 122B, 122C and 122D are separately provided from the devices 120A, 120B, 120C, 120D, and 120E and provide wireless communication paths to a signal collector and conditioning device, sometimes referred to as a gateway device 124.

The distribution system 108 is also schematically illustrated in FIG. 2 with a portion of the communication network 102. The communication network 102 includes a number of wireless sensor communication devices 126A, 126B, 126C, 126D, and 1266E respectively associated with the sensing devices 114A, 114B, 114C, 114D, and 116E. A number of wireless control communication devices 128A, 128B, 128C and 128D are separately provided from the devices 126A, 126B, 126C, 126D, and 126E and also provide wireless communication paths to the gateway device 124.

When so implemented, the wireless sensor communication devices 120 and 126 transmit or broadcast signals corresponding to the sensed data and information from the sensing devices 112 and 114, such as current readings in one embodiment, to the control communication devices 122 and 128 in each respective electrical power transmission and distribution system 104 and 108. The broadcast signals from the sensor communication devices 120 and 126 are received by the control communication devices 122 and 128 and are re-broadcast to other control communication devices 122 and 128 in the respective transmission and distribution systems 104 and 108. The control communication devices 122 and 128 may be arranged in a mesh network with one or more of the control communication devices 122 and 128 located in the signal range of any given sensor communication device 120 or 126.

In an exemplary embodiment, the sensor communication devices 120 and 126 may be relatively low cost, short range wireless transmitters or transceivers that respectively receive an input signal corresponding to an output of the sensing devices 112 and 114. Input signals from the sensing devices 112 and 114 are then wirelessly transmitted or broadcast via radio frequency (RF) signals, for example, to the control communications devices 122 and 128. Likewise, the communication devices 122 and 128 may also be relatively low cost, short range transmitters or transceivers that receive signals broadcast from the sensing devices 120 and 126, and then broadcast the received signals to other control communication devices 122 and 128 in the mesh network. The transmitters and transceivers may be battery-powered devices, or may receive power from a separate power supply.

The location of the sensing devices 112 and 114 and their associated communication devices 120 and 126 may be considered sensor nodes, and the location of the communication devices 122 and 128 may be considered communication nodes. By strategically positioning the communication nodes around the sensor nodes, and populating each with sensing devices and communication devices, a low cost yet highly adaptable communication network 102 is realized. Additionally, the communications network is highly scalable to accommodate the large number of sensing devices necessary to cover the entire power transmission system 104 and the power distribution system 108.

Radio frequency communication, for example, allows for effective communication between indoor and outdoor devices, among and between devices housed within protective enclosures, between and among above ground and underground devices, and even between and devices immersed in dielectric fluids and the like, provided that signal range limitations of the transmitters and transceivers are not exceeded. It is also contemplated that antenna structure modifications of some of the transmitters and receivers may be advisable for certain underground or subterranean installations, or installations immersed in liquids.

Figure 3:
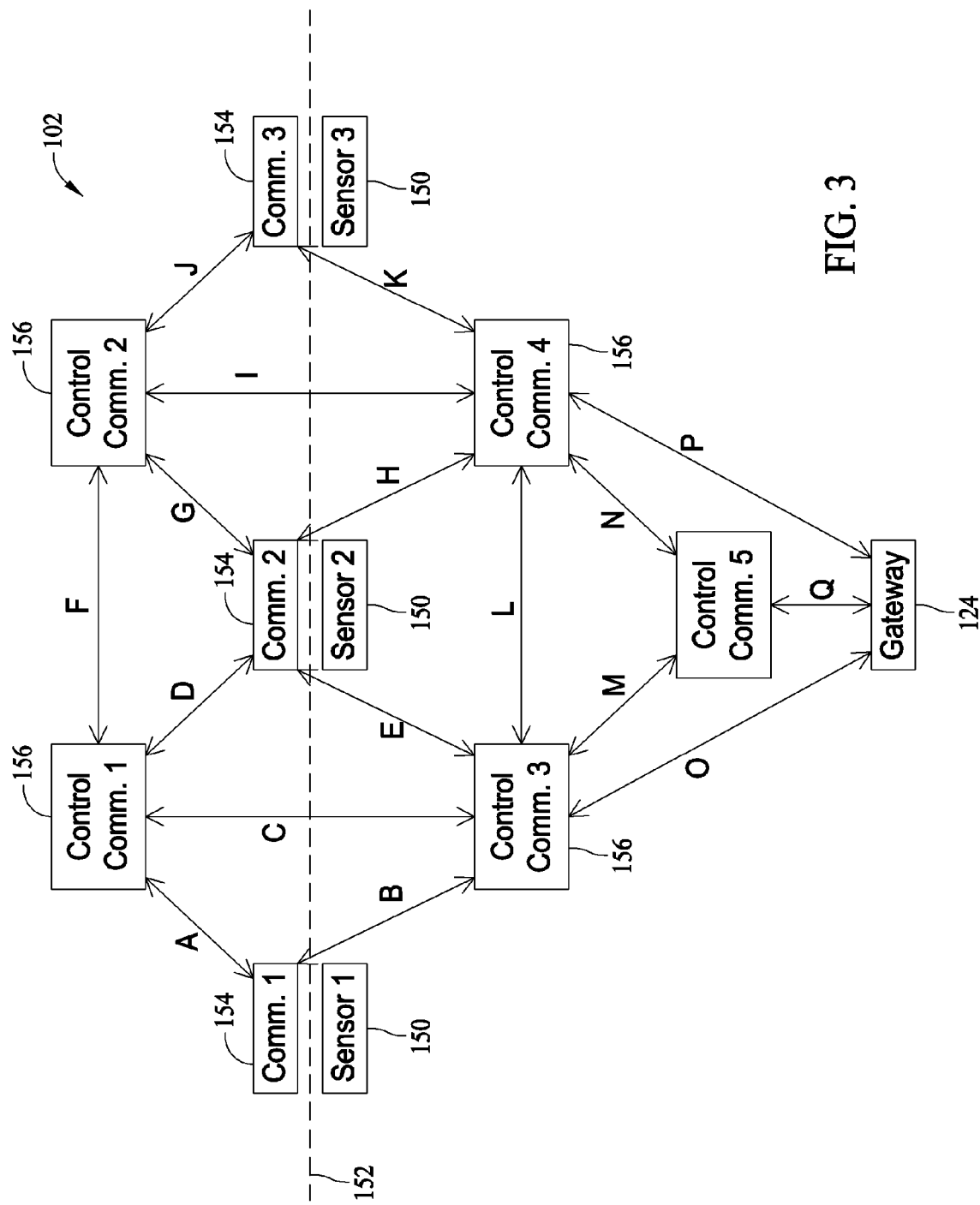
FIG. 3 schematically illustrates an exemplary installation layout of the communications network for a portion of the system shown in FIG. 1.

FIG. 3 schematically illustrates an exemplary installation layout of the communications network for either of the electrical power transmission system 104 or the distribution system 108 shown in FIG. 1.

As shown in FIG. 3, a number of sensor nodes 150 are arranged about a cable or power line 152 (shown in phantom in FIG. 3), which may be a transmission line or a distribution line. Each sensor node 150 corresponds to one of the sensing devices 112 and 114, and each sensor node 150 senses, measures or monitors an operating state of equipment, switching devices and/or protective devices connected to the power line, or alternatively monitors the power line itself with current sensing and the like. That is, the sensor nodes 150 monitor one or more local operating characteristics of the power system at their connection locations.

Sensor communication nodes 154 are provided proximate each of the sensor nodes 150 in an exemplary embodiment, and each of the sensor communication nodes 154 may correspond to the sensor communication devices 120 and 126 shown in FIG. 2. The sensor communication nodes 154 may be integrated or built-in to the sensor nodes 150, or may be separately provided from the sensor nodes 150. The sensor communication nodes 154 may be mounted on utility poles, for example, or may alternatively be provided above ground on another support structure, on the surface of the ground, or in the ground in various installations. While a one-to-one correlation of sensor nodes 150 to sensor communication nodes 154 is illustrated in FIG. 3, it is contemplated that sensor nodes 150 that are located physically proximate one another may share one sensor communication node 154 if desired.

Control communication nodes 156 are arranged about and interspersed with the sensor communication nodes 154, and are arranged in a mesh network providing multiple wireless communication paths, labeled A through Q in the example of FIG. 3, between the sensor communication nodes 154 and the control communication nodes 156, between the different communication nodes 156, and from the communication nodes 156 to the signal collector or gateway device 124. Broadcast signals from the sensor nodes 150 are accordingly transmitted by and amongst the sensor communication nodes 154 and the control communication nodes 156. Because of the multiple and redundant signal paths between the sensor nodes 154 and 156, signals may be reliably transmitted through the communication network to the gateway device 124 even if some of the communication nodes 156 fail. Many different mesh topologies are known and may be employed, including but not limited to star configurations, ring configurations, cloud configurations, linear configurations and the like. The mesh network may be algorithmically based and configured to meet specific needs for specific installations. The mesh network may also be self-configuring and self healing with autorouting and rerouting capability, and is therefore readily adaptable and amenable to addition and subtraction of communication nodes 156.

The control communication nodes 156 may be provided in locations spaced from the sensor communication nodes 154, and may be mounted on utility poles, for example, or may alternatively be provided above ground on another support structure, on the surface of the ground, or in the ground in various installations. The spacing of control communication nodes 156 and sensor communication nodes 154 is primarily dependent upon the signal range of the transmitters and receivers utilized, the actual frequency selected for the communication, and the ambient environment of the nodes 154 and 156. For example, nodes 154 and 156 in above ground installations that are generally free from any obstructions or impediment may be spaced farther from one another than for ground surface or below surface installations. While radio frequency communication is advantageous from a cost perspective, it is appreciated that other wireless communication technologies may be used in further and/or alternative embodiments of the invention.

Digital signal processing transmission techniques utilizing encoded data packets may be employed by the communication nodes 154 and 156 to convey signals including a variety of data and information of interest for a wide variety of devices. That is, the communications protocol may be a byte oriented protocol having multiple bits representative of information of interest. The encoded data and bits of information used to generate data packets for the signals transmitted may include unique radio identifiers corresponding to each of the sensor nodes 154 in the power system, serial numbers for equipment and devices monitored by the sensor nodes, device type codes for monitored equipment and devices, a location code for each sensor node, wireless addresses for the control communication nodes in the signal transmission system, time/date stamps, a software revision code for the application software, a hardware revision code for the gateway device, a data packet count for an incoming message, an error count for incoming data packets and messages, and error codes corresponding to different error conditions for the sensor nodes, the control communication nodes in the signal transmission system, and/or error conditions in the control center. Customer identifiers and contact information for operators and maintenance personnel in response to an detected alert or alarm conditions may also be encoded in the signals.

While some exemplary message codes have been described, it is understood that other types of codes, information and data representative of the operation of the power system 100 may be included in alternative embodiments, and it is also recognized that less than all of the exemplary protocol bits and codes could be used in other embodiments. Implementation of the message protocols may be conventionally provided and is not specifically described in further detail herein.

The communication nodes 156 are sometimes referred to as repeater/router elements, and the data signals are transmitted among the control communication nodes 156 in a prescribed manner to the gateway device 124. In a further embodiment, one or more the sensor communication nodes 154 may directly communicate with the gateway device 124, depending on the signal range of the communication nodes and the proximity of the gateway device 124.

Data packets may be reported from the sensor communication nodes 154 on a periodic basis, and data packets may be transmitted repeatedly within specified time periods to ensure that the data packets are completely received, processed, and optionally acknowledged by the gateway device 124. Repeated transmission of data signals avoids collision of signals when more than one of the circuit protectors operates at approximately the same time. Also, the communication nodes 156 may add a routing code, a time stamp or other information to the data packet so that the communication system and signal paths between the sensor communication nodes 154 and the control communication nodes 156 may be monitored.

The gateway device 124 collects the data signals of the communication nodes, and communicates the data signals in the same or different form to the control centers 116 and 118 for processing. The gateway device 124 may be a network based computer server system, a personal computer, a computer workstation, a programmable logic controller or other electronic controller, a processor-based hand held device or another electronic device or equivalent thereof that may receive, condition, process or interpret signals from the communication nodes 156, and communicate the signals to control centers 116, 118.

Communication between the gateway device 124 and the control centers 116, 118 may utilize long-range communication schemes such as optical fiber transmission, broadband over powerline systems, WiMAX systems, WiFi systems, Ethernet connections, satellite communications, and the like.

The gateway device 124 may perform data reduction algorithms for processing signal transmissions from the control communication nodes 156 before communicating with the control centers 116 and 118. For example, the gateway device 124 may filter incoming data signals and identify duplicate signal transmissions that may occur, for example, when more than one of the communication nodes 156 transmits the same signal to the gateway device 124, or as another example, when the same sensing node 150 signals the communication nodes 156 more than once to avoid for example, collision of data signals. Duplicate signals may be discarded or deleted by the gateway device 124 prior to communicating signals to the control center 116 or 118.

Data reduction algorithms performed by the gateway device 124 may also reduce or eliminate information from the data signals that are not necessary for the control center functionality. For example, messaging protocol information pertinent to the radio frequency transmission of the data signals in the network 102 but not pertinent to a messaging protocol for the gateway communication to the control centers 116, 118, may be stripped, eliminated, or deleted from the data signals before transmission to the control centers 116, 118.

The gateway device 124 may also perform authentication, verification, or security algorithms to ensure the integrity of the signals of the communication nodes, as well as perform diagnostic, testing, and troubleshooting procedures to ensure proper installation and operation of the sensor nodes 150 and the communication nodes 154 and 156.

Communicated signals from the gateway device 124 may be received at the control centers 116 and 118 where they may be processed, decoded or interpreted using appropriate hardware and software. Interactive, menu driven and graphic displays may be presented to the user at the control station, allowing the user to capably oversee the entire power system 100 in more or less real time as operating conditions change. The user or operator of the software may be prompted to take appropriate action in response to detected events, alarms and alerts may automatically be generated to appropriate persons, and certain protective actions may be automatically undertaken by the control system in response to communication from the sensors. Various alarm and alert conditions may be provided, and may indicate fault conditions in the transmission and distribution systems 104 and 108; threshold alarms when predetermined voltage, current or operating temperature conditions are approached; and opened circuitry alarms. The alarm conditions may be categorized and ranked in terms of severity or urgency for appropriate response by system operators.

Additionally, sensed data information and reports may be complied and generated by the gateway device 124 and/or the control centers 116, 118 as a useful tool for proactive management of the power system 100 to identify issues in the power system 100 that are likely to cause operation of one or more of the protective devices to isolate portions of the circuitry, or that are likely to cause failures of equipment and switching devices. By identifying such conditions in advance, steps may be taken to control and manage the power system 100 in a way that prevents power failures from occurring.

Having now described the various operating algorithms of the gateway device 124 and the control centers 116 and 118 functionally, programming of the gateway device and control center equipment to operate in the manner described may be conventionally provided by those in the programming arts without further explanation.

While the invention has thus far been described in the context of a single communications network, multiple communications networks may be advantageous for the maintenance oversight and control of the power system 100 (FIG. 1). The communication networks may be stand alone networks, or may share communication nodes with other mesh networks to increase the redundancy and improve reliability of the system. The networks may be categorized, grouped, or sub-grouped within the larger transmission and distribution as desired.

For example, the control communication nodes 156 in various mesh networks may be discretely grouped into defined areas of the transmission or distribution system for short range communication, and may communicate information from the sensor communication nodes 150 in the respective networks back to a central location 116 (FIG. 1) or a mobile control center 118 (FIG. 1) via a longer-range communication gateway device 124. Further, it may be desirable to provide mesh networks that may communication with one another through the longer-range gateway device 124, as well as with the central control center 116 or mobile control center 118. Special purpose mesh networks may also be created within the larger transmission or distribution system to carry out specific assignments or objectives such as monitoring a specific type of equipment or specific parameters in the transmission or distribution system. Such special purpose mesh networks may overlap wholly or partially with other mesh networks, or may stand alone from other mesh networks.

In further embodiments, providing more than one gateway device 124 may be desirable to further enhance communications by reducing the number of communication nodes need to reach the gateway device 124, or to facilitate communication between different communication networks. When multiple gateway devices 124 are provided, some communication nodes 156 may communicate selectively with some of the gateway devices but not with others. That is, special purpose gateways may be provided that collect only certain types of messages and ignore others.

The benefits of the meshed communication networks within the power system 100 are numerous. The sensing modules 150 and/or the communication nodes 156 may be retrofit to existing equipments and devices, and expensive point-to-point wiring is avoided via the wireless communication. The relatively costly gateway device 124 may be shared by hundreds of communication nodes, lowering overall equipment costs of the system. As mentioned earlier, the additional nodes can either be allowed to communicate with the nodes within its own family group, or they can use existing nodes to assist in the meshing capability of the network, leading to further cost savings.

Expansion of the network 102 may be accomplished by simply adding a sensor node 150 in the proximity of a communication node 154 and 156. or by placing additional control communication nodes 156 in the signal range of other communication nodes 156. The node count could be rapidly expanded to accommodate growth and changes in the power system 100 (FIG. 1). Regardless of expansion or modification of the power system 100, given the low relative cost of the communication nodes, additional communication nodes can be readily added into the network to monitor additional points of interest if desired.

Communication between the nodes 156 and the gateway device 124 may be bi-directional, facilitating transmission of control signals corresponding to command instructions from the control centers 116 and 118 to a specific location in the transmission or distribution system 104, 108, such as reset or trip command instructions to complete or open circuitry in portions of the system. Devices such as switches, fuses, reclosers, interrupters and the like may be remotely operated remotely operated in such a manner based upon the sensed signals. This may also expedite service restoration or system reconfiguration to improve service reliability by facilitating control of the entire power system 100 from a central location.

Moreover, the communications protocol is adaptable to communicate virtually any type of information or type of data to the control center, and control decisions could be made based upon the communicated information.

As one example, the sensor nodes 150 may be placed throughout a number of different residential subdivisions at each of the pad-mounted transformers. The sensor nodes 150 may monitor the current, or any other parameter at each transformer and the communication nodes 154 and 156 may transmit or otherwise communicate an alert signal when the sensed current exceeds a set trip point value or predetermined threshold. The sensor nodes 150 and the communication nodes 154 and 156 may also communicate signals conveying a predetermined increase in sensed current within a specific time period, a sensed loss of voltage, or an occurrence of other events of interest. The sensor communication nodes 154 may also include location information for the sensor node 150 detecting the event of interest in the broadcast signal. The location information may include descriptive information, map coordinates, or global position system (GPS) coordinates. Using such sensor and mapping information, the system controller for the power system 100 may send an operator, technician or maintenance personnel to the exact location where a fault condition or undesirable event may have occurred. By linking to specific equipment to a location database at the control center, an operator can be dispatched directly to a specific location with the equipment needed to quickly make repairs. This would greatly reduce the time to repair failed sections of the power system 100 and restore service reliability.

All of the network communication nodes 154 and 156 and node groups may be programmed with security features to prevent unauthorized access to the network. The wireless mesh sensor networks can be implemented with a wide variety of different platforms for use in power delivery.

IV. CONCLUSION

Various embodiments are disclosed herein in which the benefits of the invention are believed to be amply demonstrated.

An embodiment of a communications network for at least one of an electrical power transmission system and an electrical power distribution system is disclosed. The network communicates at least one of monitoring signals and control signals for a network of electrical circuits, and the communications network comprises at least one sensor node comprising a sensor device configured to detect an operating condition of the transmission system or the distribution system; at least one sensor communication node corresponding to the sensor device, the sensor communication node configured to transmit a first wireless signal corresponding to the detected operating condition; and at least one control communication node separately provided from the sensor communication node. The control communication node is configured to receive the first wireless signal, and transmit a second wireless signal corresponding to the first wireless signal, and a gateway device is provided in communication with the control communication node and receiving the second wireless signal.

Optionally, the sensing device comprises a current sensor. A plurality of communication nodes may be arranged in a mesh network, with the network comprising multiple and redundant wireless signal paths to the gateway device. The mesh network may be self-configuring and self healing with autorouting and rerouting capability. A control center may be in communication with the gateway device. The sensing nodes may comprise a radio frequency transmitter.

Another embodiment of a communications network for at least one of an electrical power transmission system and an electrical power distribution system is also disclosed. The control communications network comprises: a plurality of sensor nodes, each sensor node comprising a sensor device configured to detect an operating condition of at least one of cabling, equipment, switching devices and protective devices in the transmission system or the distribution system; a plurality of sensor communication nodes, the sensor communication nodes corresponding to the sensor nodes, each of the sensor communication nodes being configured to transmit a first wireless signal corresponding to the detected operating condition at the location of each sensor node; and a plurality of control communication nodes separately provided from the sensor communication nodes, the control communication nodes configured to receive the first wireless signals of the sensor communication nodes, and transmit a second wireless signal corresponding to the received signals; wherein the control communication nodes are arranged in a mesh network interspersed with the sensor communication nodes, the mesh network establishing multiple and redundant wireless signal paths among the control communication nodes.

Optionally, the network may further comprise a gateway device in communication with at least one of the control communication nodes. A control center may be in communication with the gateway device. At least one of the sensing devices may comprise a current sensor. The sensor nodes may comprise a radio frequency transmitter. The control communication nodes may also comprise a radio frequency transmitter. The mesh network may be self-configuring and self healing with autorouting and rerouting capability. At least one of the first and second data signals may comprise a digital radio frequency signal. The control communication nodes may be configured for bidirectional communication with the sensor nodes, thereby facilitating transmission of monitoring signals and control signals for the at least one of cabling, equipment, switching devices and protective devices in the transmission system or the distribution system.

An embodiment of an electrical power system is also disclosed. The power system comprise a generation facility; a transmission system receiving high voltage power from the generation facility, the transmission system comprising cabling and at least of equipment, a switching device, and a protective device connected to the cabling; a distribution system connected to the transmission system and supplying electrical power to a plurality of metering/service points, the distribution system comprising cabling and at least of equipment, a switching device, and a protective device connected to the cabling; and at least one control communication network interspersed with one of the transmission system and the distribution system. The control communications network comprises a plurality of sensor communication nodes receiving input data corresponding to a sensed electrical condition of at least one of the cabling, equipment, switching devices and protective devices in the transmission or distribution system, the sensor nodes configured to generate a wireless signal corresponding to the sensed electrical condition; and a plurality of control communication nodes spaced from the sensor communication nodes; the control nodes each configured for wireless communication, and wherein the control communication nodes define multiple and redundant wireless communication paths from the sensor communication nodes to a remote location. The control communication nodes are arranged in a mesh network interspersed with the sensor communication nodes, with the mesh network establishing multiple and redundant wireless signal paths among the control communication nodes.

Optionally, the system may further comprise a gateway device in communication with at least one of the control communication nodes. A control center may be in communication with the gateway device. The input data may correspond to sensed current conditions. The sensor nodes may comprise a radio frequency transmitter. The control communication nodes may comprise a radio frequency transmitter. The mesh network may be self-configuring and self healing with autorouting and rerouting capability. The wireless signal may comprise a digital radio frequency signal. The communications network may further be configured to communicate control signals to operate one of the transmission system and the distribution system.

Another embodiment of an electrical power system is disclosed herein. The system comprises: means for generating electrical power; means for transmitting the electrical power to a location different from the means for generating; means for distributing the electrical power to metering points; means for sensing electrical conditions in at least one of the means for transmitting and the means for distributing; means for broadcasting the sensed electrical conditions; and means for communicating the broadcast conditions along one of multiple and redundant communication paths to a location remote from the means for sensing. The means for broadcasting and the means for communicating are established without point-to-point wiring.

Optionally, the means for communicating are configured to communicate control signals to operate the means for transmitting and the means for distributing.

While the invention has been described in terms of various specific embodiments, those skilled in the art will recognize that the invention can be practiced with modification within the spirit and scope of the claims.

What is claimed is:

1. A communications network for at least one of an electrical power transmission system and an electrical power distribution system, the network communicating at least one of monitoring signals and control signals for a network of electrical circuits, the communications network comprising:
at least one sensor node comprising a sensor device configured to detect an operating condition of the transmission system or the distribution system;
at least one sensor communication node corresponding to the sensor device, the sensor communication node configured to transmit a first wireless signal corresponding to the detected operating condition; and
at least one control communication node separately provided from the sensor communication node, the control communication node configured to receive the first wireless signal, and transmit a second wireless signal corresponding to the first wireless signal; and
a gateway device in communication with the control communication node and receiving the second wireless signal.

2. The communications network of claim 1, wherein the sensing device comprises a current sensor.

3. The communications network of claim 1, further comprising a plurality of communication nodes arranged in a mesh network.

4. The communications network of claim 1, further comprising a control center in communication with the gateway device.

5. The communications network of claim 1, wherein the sensing node comprises a radio frequency transmitter.

6. The communications network of claim 1, wherein the at least one control communications mode comprises a mesh network of control communication nodes, the network comprising multiple and redundant wireless signal paths to the gateway device.

7. The communications network of claim 6, wherein the mesh network is self-configuring and self healing with autorouting and rerouting capability.

8. A communications network for at least one of an electrical power transmission system and an electrical power distribution system, the control communications network comprising:
a plurality of sensor nodes, each sensor node comprising a sensor device configured to detect an operating condition of at least one of cabling, equipment, switching devices and protective devices in the transmission system or the distribution system;
a plurality of sensor communication nodes, the sensor communication nodes corresponding to the sensor nodes, each of the sensor communication nodes being configured to transmit a first wireless signal corresponding to the detected operating condition at the location of each sensor node; and
a plurality of control communication nodes separately provided from the sensor communication nodes, the control communication nodes configured to receive the first wireless signals of the sensor communication nodes, and transmit a second wireless signal corresponding to the received signals;
wherein the control communication nodes are arranged in a mesh network interspersed with the sensor communication nodes, the mesh network establishing multiple and redundant wireless signal paths among the control communication nodes.

9. The control communications network of claim 8, further comprising a gateway device in communication with at least one of the control communication nodes.

10. The communications network of claim 9, further comprising a control center in communication with the gateway device.

11. The communications network of claim 8, wherein at least one of the sensing devices comprises a current sensor.

12. The communications network of claim 8, wherein the sensor nodes comprise a radio frequency transmitter.

13. The communications network of claim 8, wherein the control communication nodes comprise a radio frequency transmitter.

14. The communications network of claim 8, wherein the mesh network is self-configuring and self healing with autorouting and rerouting capability.

15. The communications network of claim 8, wherein at least one of the first and second data signals comprises a digital radio frequency signal.

16. The communications network of claim 8, wherein the control communication nodes are configured for bidirectional communication with the sensor nodes, thereby facilitating transmission of monitoring signals and control signals for the at least one of cabling, equipment, switching devices and protective devices in the transmission system or the distribution system.

17. An electrical power system comprising:
a generation facility;
a transmission system receiving high voltage power from the generation facility, the transmission system comprising cabling and at least one of equipment, a switching device, and a protective device connected to the cabling;
a distribution system connected to the transmission system and supplying electrical power to a plurality of metering/service points, the distribution system comprising cabling and at least one of equipment, a switching device, and a protective device connected to the cabling; and
at least one control communication network interspersed with one of the transmission system and the distribution system; the control communications network comprising:
a plurality of sensor communication nodes receiving input data corresponding to a sensed electrical condition of at least one of the cabling, equipment, switching devices and protective devices in the transmission or distribution system, the sensor nodes configured to generate a wireless signal corresponding to the sensed electrical condition; and
a plurality of control communication nodes spaced from the sensor communication nodes; the control nodes each configured for wireless communication, and wherein the control communication nodes define multiple and redundant wireless communication paths from the sensor communication nodes to a remote location;
wherein the control communication nodes are arranged in a mesh network interspersed with the sensor communication nodes, the mesh network establishing multiple and redundant wireless signal paths among the control communication nodes.

18. The electrical power system of claim 17, further comprising a gateway device in communication with at least one of the control communication nodes.

19. The electrical power system of claim 18, further comprising a control center in communication with the gateway device.

20. The electrical power system of claim 17, wherein the input data corresponds to sensed current conditions.

21. The electrical power system of claim 17, wherein the sensor nodes comprise a radio frequency transmitter.

22. The electrical power system of claim 17, wherein the control communication nodes comprise a radio frequency transmitter.

23. The electrical power system of claim 17, wherein the mesh network is self-configuring and self healing with autorouting and rerouting capability.

24. The electrical power system of claim 17, wherein the wireless signal comprises a digital radio frequency signal.

25. The electrical power system of claim 17 wherein the communications network is further configured to communicate control signals to operate one of the transmission system and the distribution system.

26. An electrical power system comprising:
   means for generating electrical power;
   means for transmitting the electrical power to a location different from the means for generating;
   means for distributing the electrical power to metering points;
   means for sensing electrical conditions in at least one of the means for transmitting and the means for distributing;
   means for broadcasting the sensed electrical conditions, the means for broadcasting corresponding to the means for sensing electrical conditions; and
   means for communicating the broadcast conditions along one of multiple and redundant communication paths to a location remote from the means for sensing;
   wherein the means for broadcasting and the means for communicating are established without point-to-point wiring, and
   wherein the means for communicating is separately provided from the means for broadcasting.

27. The electrical power system of claim 26, wherein the means for communicating are configured to communicate control signals to operate the means for transmitting and the means for distributing.

* * * * *